United States Patent Office 3,651,000
Patented Mar. 21, 1972

3,651,000
STABLE EMULSIONS
Gene N. Woodruff, Bartlesville, Okla., assignor to
Phillips Petroleum Company
No Drawing. Filed Nov. 9, 1967, Ser. No. 681,890
Int. Cl. C08c 11/68
U.S. Cl. 260—28.5   4 Claims

ABSTRACT OF THE DISCLOSURE

Stable emulsions are prepared from blends of asphalt with rubber and/or polyolefins utilizing dual function emulsifying agents containing both amino and carbonyl groups, which emulsion blends are useful as coatings for fabrics, etc., sheeting, and other structures requiring high resistance to weathering.

BACKGROUND OF THE INVENTION

This invention relates to stable emulsion blends of asphalt with rubber and/or polyolefin. In accordance with another aspect, this invention relates to the preparation of stable asphalt-rubber emulsions from cationic rubber latices and cationic asphalt emulsions formed with emulsifying agents containing both amino and carbonyl groups. In accordance with a further aspect, this invention relates to the preparation of stable asphalt-rubber emulsions from anionic rubber latices and cationic asphalt emulsions. In accordance with a further aspect, this invention relates to asphalt emulsions having improved weathering characteristics, prepared by the use of emulsifying agents containing both amino and carbonyl groups blended with an emulsion of rubber and an emulsion of polyolefin.

Air-blown asphalts are particularly useful for specialized applications such as built-up roofing, felt or fiber impregnation for preparation of water resistance membranes, etc., because of their high degree of resistance to temperature fluctuations. Generally, such applications require a hot application of the asphalt. This may be detrimental, especially if a synthetic fiber such as a polyolefin is used as the matrix. Consequently, it would be desirable to employ an emulsion application. Cationic emulsions are preferred because of their rapid curing and desirable adhesion properties. While cationic emulsions can be prepared from non-catalytically blown asphalts, these materials do not have the desired low-temperature properties and the preparation of cationic emulsions from $P_2O_5$ catalytically blown asphalts is extremely difficult. If the rubber latex is an anionic system it cannot be added to a cationic asphalt emulsion to modify the properties of a straight-blown asphalt without causing coagulation of the latex and subsequent breaking of the emulsion. Addition of the rubber to the asphalt prior to emulsification results in a viscous system which cannot be readily emulsified.

Also it is desirable to blend emulsions of asphalt, of rubber, and of plastics such as polyolefins, for example, polyethylene, to obtain a wide range of properties in the dried product. Not all cationic asphalt emulsions will blend with cationic rubber latices to give stable emulsions. In accordance with the invention described hereinbelow, it has been found that a particular series of cationic emulsions will form stable emulsions with a cationic latex.

Accordingly, it has been found according to the invention that emulsions with cationic latices and polyolefin emulsions can be made with emulsifying agents containing both amino and carbonyl groups.

Additionally, it has been found according to the invention that anionic rubber latices can be treated with a betaine derivative and then acidified to form a cationic rubber latex which in turn can be blended with a cationic asphalt emulsion.

Accordingly, an object of this invention is to provide stable emulsions of asphalt and rubber.

Another object of this invention is to provide stable emulsions of asphalt, rubber and polyolefin.

A further object of this invention is to provide a method for forming stable emulsions from anionic rubber latices.

A further object, still, of this invention is to provide stable emulsions of asphalt and rubber and/or polyolefins which are useful as coating compositions for applications necessitating articles having good weathering characteristics.

Other aspects, objects, as well as the several advantages of this invention, will be apparent to those skilled in the art upon reading the specification and the appended claims.

SUMMARY OF THE INVENTION

According to the invention, stable emulsion blends of asphalt and rubber are prepared with dual function emulsifying agents containing both amino and carbonyl groups.

Further, according to the invention stable emulsion blends of asphalt, rubber and polyolefins are made with dual function emulsifying agents containing both amino and carbonyl groups.

Also according to the invention, a method is provided for producing stable asphalt-rubber emulsions from anionic rubber latices by adding an emulsifier to an anionic rubber latex, acidifying the resulting mixture of latex and emulsifying agent with sufficient acid to form a cationic emulsion of the rubber latex and blending the cationic rubber latex emulsion with a cationic emulsion of asphalt.

In carrying out the method described above for forming stable asphalt-rubber emulsions from anionic rubber latices one can use non-ionic and amphoteric emulsifying agents and HCl as the acid.

Further, according to the invention, the stable asphalt-rubber and/or polyolefin emulsions, in view of their excellent weathering characteristics, are useful as coating compositions to impregnate synthetic fibers such as polypropylene fiber for use in roof coverings as well as for treatment of sail cloth, synthetic fiber cloth coverings for protection against weather as well as having utility for pond linings and dam construction.

DESCRIPTION OF PREFERRED EMBODIMENTS

The asphalts which can be used in the invention cover a wide range of asphalt, including either natural asphalt or residue from the distillation of petroleum. The preferred asphalts are those having a high resin content and a relatively low oil content. These asphalts can be characterized by a ring and ball softening point in the range of about 50° F. to 225° F., preferably above 85° F., with a specific gravity in the range of about 0.95 to 1.15, a penetration value (ASTM D5-49) in the range of about 100 to 200 at 77° F., and a viscosity in Saybolt Furol seconds below 250 at 210° F.

Suitable asphaltic materials are air blown asphalt and catalyzed air blown asphalt employing such catalysts as phosphorus pentoxide and zinc chloride. Vacuum reduced virgin asphalt and naturally occurring asphalts such as Gilsonite are also suitable. Solvent extracted asphalt and cracked asphalts from cracked crude can be used, preferably when air blown. The above list is not exhaustive and other types of high softening asphalts comparable to the paove-named materials as known in the art can be used.

As indicated above, the asphalt emulsion of the invention is cationic and can be prepared by any method suitable known to those skilled in the art.

A particularly useful class of emulsifying agents is that containing both amino and carbonyl groups such as those emulsifying agents having the formula

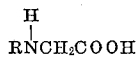

wherein R is an aliphatic hydrocarbon radical containing 4–25 carbon atoms.

Illustrative examples of amphoteric agents having the above formula are coco glycine, cetyl betaine, 1(2-aminoethyl)-2-mixed heptadecenyl, and heptadecadienyl-2-imidazoline.

The relative amounts of the various components of the asphalt emulsions can vary, but, in general, the asphalt is present in an amount in the range of 50 to 70, preferably 55 to 65 weight percent; the emulsifier is present in an amount in the range of 0.1 to 4, preferably 0.25 to 1 weight percent; and water is present in the amount of between 50 and 25, preferably, 30 to 40 weight percent, based on the total asphalt emulsion. Enough acid such as HCl sulfuric, etc. can be added so as to give a pH in the range of 2 to 6.

The asphalt emulsions employed can be prepared by any method known to those skilled in the art, for example, by preparing a soap solution comprising water, either soft or hard, and an emulsifying agent as defined. The soap solution is then mixed in a colloid mill, or the like, with the asphalt phase, the latter being preferably heated to reduce the viscosity. Usually the emulsifiers and any modifiers or promoters are dispersed in the water to form a soap solution which is then warmed to a temperature of 90° F. to 200° F. The asphalt can be heated to a temperature in the range of 150° F. to 350° F. The warm soap solution and hot asphalt are then proportioned to a colloid mill to emulsify the mixture, during which milling the temperature of the mixture can be in the range of 100° F. to 210° F. The completed emulsion is then cooled to a temperature below 150° F. before being used or transferred to storage. The method of preparing an emulsion will have some effect on the properties thereof and the intended application or utility of the emulsion will dictate which particular method one should use to get the desired properties.

In addition, an acid, such as hydrochloric acid, sulfuric acid, acetic acid, or sulfamic acid, can be incorporated into the asphalt emulsion to enhance the surface active properties of the cationic emulsifying agent and impart an acid pH below 7 to the emulsion. Generally, pH's in the range of 2 to about 6.5, preferably 3 to 5, are suitable for these acidic emulsions. The amount of the acid will generally be 0.1 to 1, preferably 0.2 to 1, weight percent of the emulsion, but can be considered and calculated as part of the cationic emulsifying agent. Sulfamic acid is especially useful where the asphalt used is of an aromatic nature and has an oil fraction which has an A.P.I. gravity not exceeding 15.5, and preferably not exceeding 15.

The rubber which is used in the composition can be either natural rubber or synthetic polymers or copolymers.

The synthetic rubbers employed are preferably polymers of open chain conjugated dienes having from 4 to 8 carbon atoms per molecule, for example, 1,3-butadiene, 2,3-dimethyl-1,3-butadiene, and the like. Examples of such polymers are polybutadiene, polyisoprene, polychloroprene, and the like. Copolymers of mixtures of such conjugated dienes can also be used as well as copolymers of monomer systems having a major amount of conjugated diene with a minor amount of copolymerizable monomer containing a $CH_2=C<$ group.

Examples of such synthetic elastomers are butadiene-styrene copolymers, butadiene, acrylonitrile copolymer, and various vulcanizable solid or semi-solid isoolefin-conjugated diene copolymers. Other copolymerizable monomers which can be used with the class of conjugated dienes described include alpha-methylstyrene, 4-chlorostyrene, 5-methylstyrene, 4-methoxystyrene, 2-vinyl-pyridine, 2-methyl-5-vinylpyridine, 5-methyl-2-vinylpyridine, 5-ethyl-2-vinylpyridine, 4-methyl-2-vinylpyridine, 2-isopropenylpyridine, 5-propyl-2-isopropenylpyridine, 2-octyl-5-vinylpyridine, methacrylonitrile, methyl acrylate, methyl methacrylate, ethyl acrylate, ethyl methacrylate, ethyl vinyl ketone, methyl isopropenyl ketone, methyl vinyl ether, and the like.

As indicated above, rubber latex, if an anionic system, cannot be added to a cationic asphalt emulsion to modify the properties of a straight blown asphalt, for example, without causing coagulation of the latex and subsequent breaking of the emulsion. It has been found that by the addition of an emulsifier, either non-ionic or amphoteric, to the anionic latex system followed by acidification to form a cationic latex emulsion which in turn can then be blended with a cationic asphalt emulsion, there can be formed a stable product. It has been found that when betaine derivatives are used as the emulsifier with the anionic rubber system, the acid addition activates the amine portion of the betaine surfactant, giving a stable cationic latex which can be added readily to the cationic asphalt emulsion.

Representative non-ionic emulsifiers that can be added to anionic rubber latex systems include: Triton X–305 (octyl phenyl polyethoxy ethanol). Triton X–114 (isooctyl phenyl polyethoxy ethanol) in general compounds of this type containing 20 to 60 ethylene oxide groups.

Other examples include:

Alkylaryl polyether (Triton CF–21)
Nonyl phenyl polyethoxy ethanol (Triton N–101)
Nonyl phenyl polyethoxy ethanol (Triton N–128)
Isooctyl phenyl polyethoxy ethanol (Triton X–100)
Isooctyl phenyl polyethoxy ethanol (Triton X–102)
Isooctyl phenyl polyethoxy ethanol (Triton X–114)
Alkylaryl polyether alcohol (Triton X–120)
Alkylaryl polyether alcohol (Triton X–155)
Octyl phenyl polyethoxy ethanol (Triton X–165)

Representative examples of suitable amphoteric emulsifiers that can be added to anionic rubber latex systems as noted above include: cetyl betaine, coco glycine, and myristal ammonium sulfonic acid betaine.

The relative amounts of the various components of the rubber emulsion can vary, but in general the rubber is present in an amount in the range of 5 to 60, preferably 10–30, weight percent; the emulsifier is present in an amount in the range of 0.1 to 5, preferably 0.25 to 2, weight percent; and water is present in an amount between 40 to 95 weight percent based on the total blend. An auxiliary emulsifier, added to maintain the emulsion in the acid state, is present in an amount in the range of 0.5 to 5.0, preferably 1 to 3 weight percent.

The rubber emulsion can be prepared by any method suitable and known to those skilled in the art. One suitable procedure for preparing the rubber emulsions is one following substantially the same procedure utilized for preparing the asphalt emulsions.

In preparing the cationic rubber emulsion, an emulsifying agent from the classes of non-ionic or amphoteric is added to an anionic rubber latex and an acid, such as hydrochloric acid, sulfuric acid, acetic acid, or sulfamic acid, can be incorporated into the rubber emulsion to impart an acid pH below 7 to the emulsion. Generally, pH's in the range of 1 to about 10, preferably 2 to 4, are suitable for these acidic emulsions. The amount of the acid will generally be 0.1 to 1.5, preferably 0.3 to 0.8 weight percent of the emulsion, but can be considered and calculated as part of the emulsifying agents.

As an additional feature of the invention, emulsions of polyolefins can also be incorporated into the asphalt-rubber emulsions. Polyolefins that can be added include homopolymers and copolymers of ethylene with other aliphatic monoolefins such as propylene, butene-1, butene-2, and the like, in which the copolymers contain at least 80 percent polymerized ethylene. The polyolefins that can be employed according to the invention are described in greater detail in U.S. Patent 2,825,721, Hogan et al.

The emulsifying agents employed to prepare the polyolefin emulsion can be cationic, anionic, or non-ionic, or combinations thereof.

A presently preferred emulsifying agent is oleic acid with triethanolamine in which the weight of oleic acid is 1.2 to 1.4 times the weight of triethanolamine.

The relative amounts of the various components of the polyolefin emulsion can vary, but in general the polyolefin emulsion can vary, but in general the polyolefin is present in an amount in the range of 10 to 20 weight percent; the emulsifier is present in an amount in the range of 3 to 10 weight percent; and the water is present in an amount between 70 and 87 weight percent. The pH is 1 to 10.

The emulsions or blends of emulsions of the invention can be applied, for example, to a cloth or mat made from fibers, including synthetic fibers that have previously been woven or matted into cloth or a structure resembling same, to form a substantially waterproof structure. The emulsions or blends of emulsions can be applied also to such substrate surfaces as metal, wood, and plastic. The water and emulsion is then removed by any suitable method, such as air drying or drying in an oven or by heat employed similar to a molding operation.

The compositions of the invention are useful for battery cases, for insulating purposes as waterproofing material for roofs and the like, for covering spaced-in surfaces and irrigation canals, ponds, open dams, and the like, and for related uses. The impregnated cloth or matting can be used for either temporary or permanent roofing, for mulching, for tenting material, and other related uses.

Example I

Stable emulsion blends of asphalt-rubber-polyethylene were prepared using coco glycine and cetyl betaine as emulsifying agents for preparing the asphalt emulsion prior to blending with the rubber latex and polyethylene emulsion.

The polyethylene emulsions were prepared as follows: Melted 93 g. AC Polyethylene 629. To the melted polyethylene was added a mixture of 18 g. oleic acid and 13.8 g. triethanolamine. The resulting melt at about 130° C. was poured slowly into 458 g. $H_2O$ which was at 95° C. The water was stirred with high speed stirrer during the melt addition and for one minute thereafter. A stable emulsion, pH 8.5 resulted.

Table I sets forth the various emulsion blends prepared, setting forth the amount of asphalt and specific emulsifying agent used for the asphalt emulsions, as well as, the amount of rubber in the latex and polyethylene in the polyethylene emulsion. Additionally, the composition of the blended product after drying is set forth in the tabulation as well as the pH for each of the three ingredients prior to blending.

The asphalt emulsion, the rubber latex, and the polyethylene emulsion were separately prepared and then blended together to form the stable emulsion blend.

TABLE I

| Run | Asphalt emulsion | | | Rubber latex | | | Polyethylene emulsion | | | | Composition of blended product after drying | | | | pH asphalt emulsion | pH rubber latex | pH poly $C_2^=$ emulsion |
|---|---|---|---|---|---|---|---|---|---|---|---|---|---|---|---|---|---|
| | Percent asphalt in emulsion | Gm. of asphalt emulsion | Gm. asphalt | Emulsifying agent | Percent rubber in latex | Gm. rubber added | Gm. latex added | Percent poly $C_2^=$ in emulsion | Gm. poly $C_2^=$ emulsion added | Gm. poly $C_2^=$ solids | Percent asphalt | Percent rubber | Percent poly $C_2^=$ | | | |
| 1 | 56.2 | 50 | 28.1 | Culveram CDG coco glycine | 67.0 | 6.7 | 10 | 40.8 | 10 | 4.1 | 72.2 | 17.2 | 10.6 | 3.7 | 3.0 | 5.0 |
| 2 | 58.2 | 50 | 29.1 | BCO cetyl betaine | 67.0 | 6.7 | 10 | 40.8 | 10 | 4.1 | 73.0 | 16.8 | 10.2 | 4.0 | 3.0 | 6.0 |
| 3 | 62.4 | 50 | 31.2 | Culveram CDG coco glycine | 67.0 | 6.7 | 10 | 40.8 | 10 | 4.1 | 74.2 | 16.0 | 9.8 | 4.4 | 3.0 | 5.5 |
| 4 | 61.6 | 50 | 30.8 | Forswanic* | 67.0 | 6.7 | 10 | 40.8 | 10 | 4.1 | 74.0 | 16.1 | 9.9 | 4.7 | 3.0 | 5.5 |
| 5 | 56.2 | 50 | 28.1 | Culveram CDG coco glycine | 67.0 | 6.7 | 10 | 22.3 | 10 | 2.2 | 75.9 | 18.1 | 6.0 | 3.7 | 3.0 | 8.5 |
| 6 | 58.2 | 50 | 29.1 | BCO cetyl betaine | 67.0 | 6.7 | 10 | 22.3 | 10 | 2.2 | 76.6 | 17.6 | 6.8 | 4.0 | 3.0 | 8.5 |

*1(2-amino ethyl)-2-mixed heptadecenyl and heptadecadienyl-2-imidazoline.

Example II

Weathering tests were conducted for blend emulsions of asphalt, rubber and polyethylene. The asphalt emulsions were prepared by the use of emulsifying agents containing both amino and carbonyl groups and then blended with rubber and the emulsion of polyethylene.

Three asphalt emulsions designated as a, b, and c in Table II, were prepared as follows:

Asphalt a.—3.36% emulsifier coco glycine in final emulsion of grade 85/100 asphalt. The pH of aqueous solution was 3.3. Emulsifier 35% pure.

Asphalt b.—3.2% emulsifier cetyl betaine in final emulsion of 85/100 grade asphalt. The pH of the aqueous solution was 3.2. Emulsifier 35% pure. Note that the above percentages refer to impure material diluted by inerts such as water. The amount of pure emulsifier would be ⅓ the above.

Asphalt c.—1.27% emulsifier coco glycine in final emulsion of 85/100 grade asphalt. The pH of the aqueous solution was 4.0.

In all of the above three asphalt emulsions the pH shown was reached by the addition of HCl (about .05% HCl based on the finished emulsion).

The polyethylene emulsion D used is designated by the Spencer Chemical Co. as "Poly Em" and is a non-ionic emulsion having a pH of 9.0 and is 40.8% solids. Emulsion E is as described in Example I.

The rubber latex F is designated by the Dow Chemical Co. as Dow #815 and is a carboxylated latex of 50% solids and pH of 9.7. Rubber latex G is designated by the Goodyear Tire and Rubber Co. as Pliolite 5352 and has a pH of 9.2 and is 68% solids.

These emulsion blends were coated upon strips of stainless steel, air-dried for 12 hours at ambient temperature. The coated strips were then tested in the Weatherometer (129 hours carbon arc, temperature 145° F., water spray 12 minutes every two hours). The Weatherometer is manufactured by Atlas Electric Devices Co., Chicago, Ill. and is described in their catalogue "Atlas Weatherometer" (1956). The data for these tests is set forth in Table II. Damage, that is, poor adhesion as represented by cracking and "alligatoring," is presented by a scale of 1 to 10, in which 1 represents no appreciable damage, and 10 represents extensive damage. Extensive damage was observed in strips coated with asphalt, while only slight damage was observed in strips coated with emulsions containing asphalt, rubber and polyethylene.

latex to 2.6. The resulting emulsion remained stable. SBR latex ordinarily coagulates when made acid.

The asphalt emulsion was made by an emulsifying agent called Nalco TX 22–66 and TX 26–66 which combination was a mixture of polyoxyethylated amines, diamines or amides. The emulsion was prepared by the addition of 40 g. Nalco TX 22–66, 40 g. Nalco TX 26–66, and 45 g. conc. HCl to 2900 g. $H_2O$ at a temperature of 130° F. The pH of the resulting aqueous solution was 1.5. After milling air-blown asphalt (R & B [1] 174F) with the aqueous solution in a colloid mill, the resulting emulsion contained 65% asphalt, 0.93% emulsifier TX 22–66 and TX 26–66.

The above acidified latex having a pH of 2.6 was added in an amount of 24.6 grams to 51.6 grams of an asphalt emulsion. A stable asphalt-rubber emulsion resulted.

In the above SBR latex there was contained 16.04 percent rubber.

Example IV

Another sample of an anionic rubber latex was rendered cationic by adding thereto amphoteric emulsifying agent followed by acidificiation.

An amphoteric emulsifying agent Du Pont BCO (a betaine) in the amount of 7.6 grams was added to 252.7 grams SBR 1502 latex which had a pH of 8.8. Sufficient HCl was added to the resulting mixture to lower the pH to 3.9.

A cationic asphaltic emulsion formed from asphalt and Nalco TX22–66–TX26–66 as emulsifying agents. The emulsifier used for the asphalt emulsification is a 50–50 blend of two emulsifiers. TX22–66 is a non-ionic polyethylene glycol, and TX26–66 is a polyethylene glycol ether.

In preparing the stable emulsion blend, 23 grams of a cationic asphalt emulsion was blended with 10 grams of the acidified rubber latex. The blended mixture resulted in a stable emulsion.

The asphalt employed in the asphalt emulsion was an air blown asphalt having a 174° F. ring and ball and a penetration of 27.

Example V

In a further run, SBR latex 1502 was rendered compatible with a cationic asphalt emulsion by adding an amphoteric emulsifier to the latex, followed by acidification.

In this run, 462.5 grams SBR latex and 13.9 grams of

TABLE II

| Test strip | Asphalt emulsion for blend (50 gm.) | Rubber latex (10 gm.) | Polyethylene emulsion (10 gm.) | Calculated composition of dried blend (percent) | | | Remarks | Average rating of damage |
|---|---|---|---|---|---|---|---|---|
| | | | | Asphalt | Rubber | Polyethylene | | |
| 1 | Yes Emulsion a | None | None | 100 | 0 | 0 | Extensive damage. | 10 |
| 2 | Yes Emulsion b | do | do | 100 | 0 | 0 | do | 10 |
| 3 | Yes Emulsion c | Yes Emulsion G | Yes Emulsion D | 74.2 | 16.1 | 9.7 | Some Damage. | 6 |
| 4 | Yes Emulsion b | do | do | 72.8 | 17.1 | 10.1 | Slight damage. | 4 |
| 5 | do | do | Yes Emulsion E | 76.3 | 17.9 | 5.8 | Some damage. | 6 |
| 6 | do | Yes Emulsion F | Yes Emulsion D | 76.2 | 13.1 | 10.7 | No appreciable damage. | 2 |
| 7 | do | do | Yes Emulsion E | 80.2 | 13.7 | 6.1 | do | 2 |
| 8 | Yes Emulsion a | Yes Emulsion G | Yes Emulsion D | 72.1 | 17.4 | 10.5 | do | 1 |
| 9 | do | do | Yes Emulsion E | 75.8 | 18.3 | 5.7 | Some damage. | 6 |
| 10 | do | Yes Emulsion F | Yes Emulsion D | 75.6 | 13.4 | 11.0 | do | 7 |
| 11 | do | do | Yes Emulsion E | 79.6 | 14.2 | 6.2 | do | 6 |

Example III

This example illustrates the formation of a stable blend of emulsions from an anionic rubber latex and a cationic asphalt emulsion. In this example, a non-ionic emulsifier was added to SBR latex 1502 (butadiene-styrene copolymer) followed by acidification and blending with a cationic asphalt emulsion.

In preparing the cationic rubber latex, 0.7 gram of non-ionic emulsifier (Triton X–305) was added to 23.7 grams of SBR 1502 latex and then diluted HCl was added to the mixture in an amount sufficient to reduce the pH of the latex to 2.6.

Du Pont BCO (a betaine) was stirred and diluted HCl added in an amount sufficient to produce an emulsion having a pH of 4.0. The rubber emulsion was blended with 536.5 grams of an emulsion of blown asphalt containing 0.48 percent emulsifier consisting of Nalco TX22–66 and TX26–66 (50 percent each). In preparing the blend, 176.2 grams of rubber latex was used.

This example demonstrates blending of a rubber with a high ring and ball asphaltic product to produce a stable blend.

[1] Ring and Ball.

I claim:
1. A stable asphalt-rubber-polyolefin emulsion having improved weathering characteristics consisting essentially of a blend of
(a) 1 to 60 weight percent of a cationic rubber latex of natural rubber or homopolymers and copolymers of conjugated dienes having from 4–8 carbon atoms, inclusive, per molecule, containing 5–60 weight percent rubber, 0.1–5 weight percent emulsifier, 40–95 weight percent water, and having an acid pH below 7,
(b) 1 to 60 weight percent of a cationic asphalt emulsion containing 50–70 weight percent asphalt, 0.1–4 weight percent emulsifier, 50–25 weight percent water, and having a pH of 2–6, said emulsifier being at least one emulsifying agent containing both amino and carbonyl groups having the formula

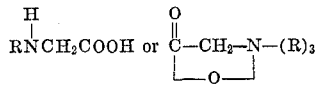

wherein R is an aliphatic hydrocarbon radical containing 4–25 carbon atoms, and
(c) 1 to 60 weight percent of an emulsion of a polyolefin containing 10–20 weight percent polyolefin, 3–10 weight percent of a cationic, nonionic or amphoteric emulsifier, 70–87 weight percent water, and a pH of 1–10, said polyolefin being a homopolymer of ethylene or copolymer of ethylene with other aliphatic monoolefins in which the copolymer contains at least 80 percent polymerized ethylene.
2. A composition according to claim 1 wherein the emulsifier in (b) is coco glycine or cetyl betaine.
3. A composition according to claim 2 wherein (a) is a rubbery polymer of butadiene.
4. A composition according to claim 1 wherein (a) is a butadiene-styrene copolymer and (c) is polyethylene.

References Cited
UNITED STATES PATENTS

| | | | |
|---|---|---|---|
| 3,085,889 | 4/1963 | Swift | 260—28.5 B |
| 3,205,187 | 9/1965 | Vanderhoff | 260—29.7 |
| 3,298,855 | 1/1967 | Helin et al. | 260—29.6 OL |
| 3,432,339 | 3/1969 | Howell et al. | 260—29.6 OL |
| 3,422,026 | 1/1969 | Wright | 260—311.5 |

FOREIGN PATENTS

| | | | |
|---|---|---|---|
| 531,195 | 12/1940 | Great Britain | 260—29.7 N |

OTHER REFERENCES

Noble: Latex in Industry (2nd Ed.) (Rubber Age) (N.Y.) (1953), pp. 289–291.

Schwartz et al.: Surface Active Agents (vol. 1) (Interscience) (N.Y.) (1949), pp. 10, 218–219, 506.

Fischer: Colloidal Dispersions (Wiley) (N.Y.) (1950), pp. 124 and 125.

MORRIS LIEBMAN, Primary Examiner

H. H. FLETCHER, Assistant Examiner

U.S. Cl. X.R.

117—133, 138.5, 138.8 R, 148; 252—311.5; 260—28.5 B, 29.6 XA, 29.7 N, 4 R